United States Patent [19]
Pate et al.

[11] Patent Number: 5,944,831
[45] Date of Patent: Aug. 31, 1999

[54] POWER MANAGEMENT APPARATUS AND METHOD FOR MANAGING POWER APPLICATION TO INDIVIDUAL CIRCUIT CARDS

[75] Inventors: John C. Pate, Austin; John J. Pearce, Del Valle, both of Tex.

[73] Assignee: Dell USA, L.P., Round Rock, Tex.

[21] Appl. No.: 08/874,493

[22] Filed: Jun. 13, 1997

[51] Int. Cl.[6] .................................................. G06F 1/00
[52] U.S. Cl. .................... 713/324; 710/102; 379/102.04; 375/222
[58] Field of Search ........................ 395/750.06, 750.05, 395/750.07, 750.08, 750.03, 750.1; 379/102.04, 93.36; 375/222; 713/300, 320, 323, 324, 330, 340; 710/102

[56] References Cited

U.S. PATENT DOCUMENTS

| | | |
|---|---|---|
| 4,961,220 | 10/1990 | Tentler et al. . |
| 5,167,024 | 11/1992 | Smith et al. . |
| 5,530,879 | 6/1996 | Crump et al. . |
| 5,588,054 | 12/1996 | Shin et al. . |
| 5,644,594 | 7/1997 | Jonhson et al. ........................ 375/222 |
| 5,754,870 | 5/1998 | Pollard et al. ..................... 395/750.05 |

OTHER PUBLICATIONS

Hugh G. Willett, Electronic Buyers' News 90–11–05, ISSN–0164–6362, p. 37, Copyright 1990 CMP Publications, Inc.

Ken Stufflebeam, "Power Management Support in the PC Card Standard", May 14, 1997, pp. 1–2, Internet address http://www.pc–card.com/papers/powman.htm.

"Detailed Overview of the PC Card Standard", May 14, 1997, pp. 1–8, Internet address: http://www.pc–card.com/stand–_overview.html.

*Primary Examiner*—Ayaz R. Sheikh
*Assistant Examiner*—Xuong Chung-Trans
*Attorney, Agent, or Firm*—Skjerven, Morrill, MacPherson, Franklin & Friel, L.L.P.; Ken J. Koestner

[57] ABSTRACT

Communication interface PCCards are commonly attached, both physically and electrically, to a notebook computer whether the communication interface PCCards are connected to a communication channel or disconnected from the communication channel. It has further been discovered that communication interface PCCards consume power when attached to the notebook computer and that power consumption is advantageously reduced and battery life extended by detecting when the communication channel is disconnected from the communication interface PCCard and terminating power supplied to the communication interface PCCard when the communication channel is disconnected. A power management method in a computer system having a PCCard connected to a communication channel includes detecting a disconnection of the communication channel from the PCCard and terminating power supplied to the PCCard in response to the detection of the disconnection of the communication channel.

28 Claims, 5 Drawing Sheets

POWER MANAGEMENT APPARATUS AND METHOD FOR MANAGING POWER APPLICATION TO INDIVIDUAL CIRCUIT CARDS

BACKGROUND OF THE INVENTION

1. Field of the Invention

The present invention relates to power management in computer systems and processors. More specifically, the present invention relates to an apparatus and operating method for managing application of power to a circuit card.

2. Description of the Related Art

Present-day notebook computers commonly include a processor mounted on a motherboard and a case supporting a keyboard and display. Data storage is commonly supplied by multiple magnetic disk drives including a hard drive and a floppy drive. One or more PCMCIA cards (PCCars) are optionally included in a notebook computer to perform various functions. Common PCCards in notebook computers include communication interfaces such as modems and network interface cards. While networking and modem PCCards are highly useful and add important functionality to notebook computers, they disadvantageously consume power whether in use or inactive.

Power consumption of the networking and modem PCCard is generally not a problem when the notebook computer and user are located near a local area network (LAN) or telephone outlet since a wall socket is normally accessible to power the notebook computer. However many notebook computer users commonly leave the communications interface PCCard inserted into the notebook computer at all times, treating the PCCard as a built-in component, whether the notebook computer is connected to the LAN or telephone output and powered by a wall socket or the notebook computer is disconnected from communications lines and an external power source.

The operating practices of many users further increases the power drain and shortens the battery life of the notebook computer. For example, many users configure a notebook computer system to automatically start software applications that utilize the communications interfaces by default, for example on power-up of the notebook computer.

Various techniques have been developed to reduce the power consumption and extend the battery life of notebook computers. An Advanced Configuration and Power Interface (ACPI) specification has been developed to implement motherboard configuration and power management functions using suitable cost/function tradeoffs in personal computers including desktop, mobile, home and server computers. The ACPI specification also enhances power management functionality and robustness, facilitates and accelerates industry-wide implementation of power management, and creates a robust interface for configuring motherboard devices.

Specifically with regard to PCCard power consumption, including communication interface consumption, many notebook computers include power management techniques that allow a PCCard slot to be disabled. In addition, manufacturers of PCCards use low power consumption components to conserve battery resources.

Conventional power management techniques successfully reduce power consumption in portable computers often by one-half or more depending on the device powered by the PCCard and the power management techniques that is used. However, a computer having a communication interface PCCard connected to a PCCard slot in the computer continues to draw current and consume power even when the PCCard is disconnected from a network. In some systems, power management places the PCCard in a lower power state but the PCCard continues to draw power, reducing the time that the battery is suitably charged for execution.

SUMMARY OF THE INVENTION

It has been discovered that communication interface PCCards are commonly inserted, both physically and electrically, to a notebook computer whether the communication interface PCCards are connected to a communication channel or disconnected from the communication channel. It has further been discovered that communication interface PCCards consume power when attached to the notebook computer and that power consumption is advantageously reduced and battery life extended by detecting when the communication channel is disconnected from the communication interface PCCard and terminating power supplied to the communication interface PCCard when the communication channel is disconnected.

In accordance with an embodiment of the present invention, a power management method in a computer system having a PCCard connected to a communication channel includes detecting a disconnection of the communication channel from the PCCard and terminating power supplied to the PCCard in response to the detection of the disconnection of the communication channel.

In accordance with a further embodiment of the present invention, a computer program product includes a computer usable medium such as a diskette, a CD ROM, or the like that has a computable readable code embodied therein which stores an executable program code for performing the described power management method.

In accordance with an embodiment of the present invention, a computer system includes a processor, a storage connected to the processor and having a program storage, and a PCCard detachably connected to the processor. The PCCard includes a communication interface for interfacing to a communication channel. The computer system further includes a sensor for detecting connection and disconnection of a cable linking the communication interface to the communication channel.

In accordance with a further embodiment of the present invention, a PCCard includes a communication interface for interfacing to a communication channel and a sensor for detecting connection and disconnection of a cable linking the communication interface to the communication channel. Many advantages are achieved by the disclosed power conservation system and operating method. It is advantageous that current drain and power consumption are reduced beyond the levels achieved by conventional power management techniques. It is advantageous that battery life in a portable, notebook, laptop, or handheld computer system is extended. It is further advantageous that power management of a PCCard is achieved automatically, without intervention by the system user.

The power conservation system and operating method advantageously reduce thermal heat generation, a highly desirable advantage in present-day portable computers that use higher speed, higher performance processors, and therefore generate greater amounts of thermal heat. Reducing the generated heat avoids the use of cooling fans. Fans disadvantageously create annoying noises, increase packaging size of portable computers, increase maintenance and reliability problems, and consume power.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings. The use of the same reference symbols in different drawings indicates similar or identical items.

DETAILED DESCRIPTION OF THE ILLUSTRATIVE EMBODIMENTS

Figure 1:
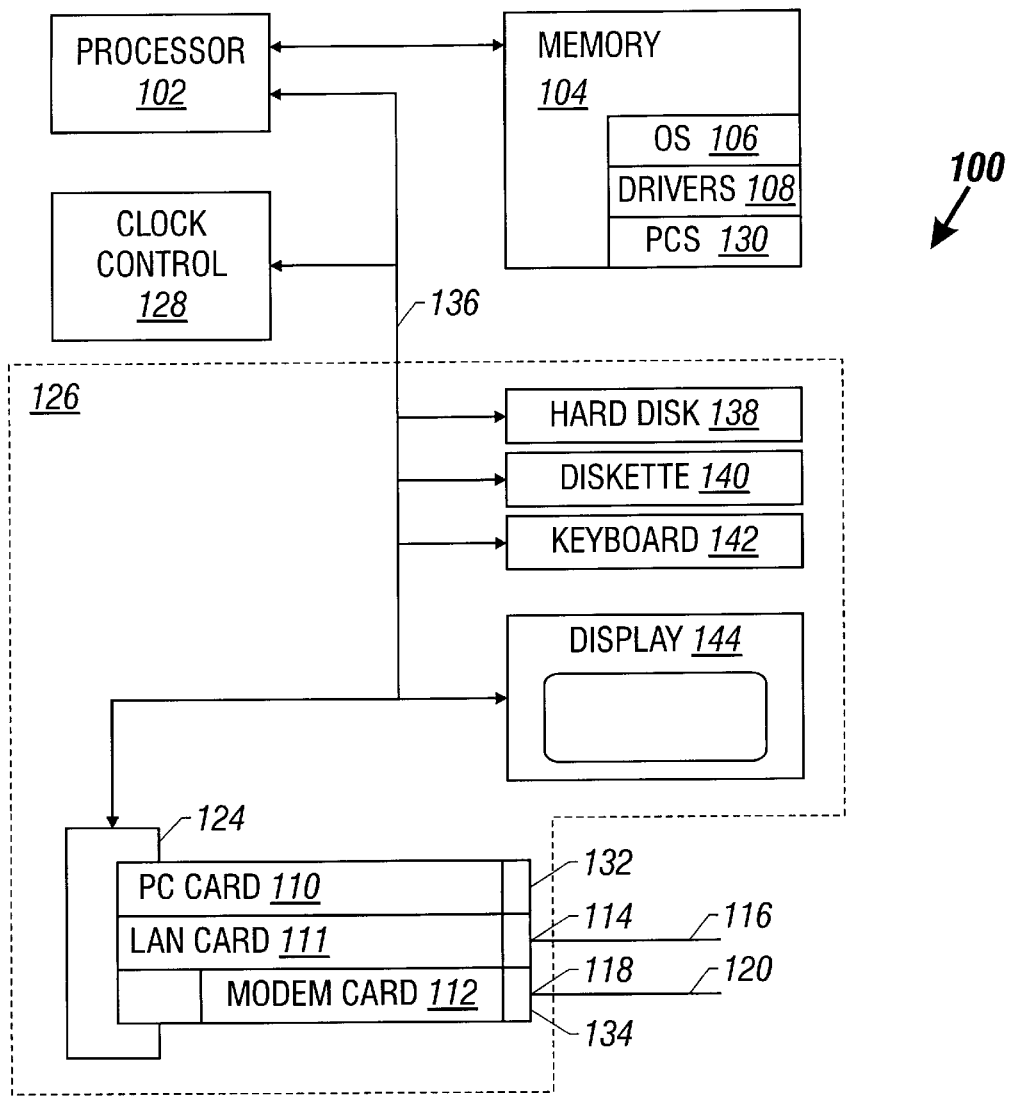
FIG. 1 is a schematic block diagram depicting a notebook computer that is suitable for implementing a system and operating method for managing power application to individual PCMCIA cards.

Referring to FIG. 1, a schematic block diagram depicts a notebook computer 100 that is suitable for implementing a system and operating method for managing power application to individual PCCards. The notebook computer 100 includes a processor 102, a memory 104 connected to the processor 102, a plurality of input/output (I/O) devices 126, and a processor clock controller 128. The memory 104 supplies storage for instructions and data including operating system 106, communication device driver 108, and a power management system 130. The processor 102 includes not only a processor, such as a microprocessor, a central processing unit (CPU), a controller, or the like, but also includes associated subsystems that are typically suitable for operation of a personal computer. A processor bus 138 interconnects the processor 102 and the memory 104. In various embodiments, the processor 102 may be a single-chip computer, or a plurality of processor and support integrated circuit chips.

In one embodiment, the power management system 130 is an Advanced Configuration and Power Interface (ACPI) system which includes various software systems (not shown) including a kernel, Operating System Power Management (OSPM) system code, a plurality of communication device drivers 108, and an ACPI driver/ACPI Machine Language (AML) interpreter. The ACPI driver/AML interpreter interfaces to hardware within the notebook computer 100 via APCI registers, APCI BIOS and ACPI tables (not shown). The ACPI tables describe interfaces to hardware. The operating system 106 contains and uses an AML interpreter that executes procedures encoded in the ACPI machine language and stored in the ACPI tables. The ACPI BIOS bootstraps the processor 102 and implements interfaces for sleep, wake and restart conditions.

The monitoring functions performed by the power management system 130 are dependent upon the types of I/O devices 126 that are employed and the implementation of the notebook computer 100. For example, some I/O devices generate interrupt signals directed to the processor 102 when the device is accessed.

The PC power management system 130 determines when a particular device is active. When a device has remained inactive for a predetermined interval, as indicated by the expiration of a corresponding activity timer, the PC power management system 130 performs operations for placing the device in a reduced power consumption state. The operations performed by the PC power management system 130 to control power 10 to particular I/O devices depends on the nature of the devices. For example, if the device controlled is the hard disk drive 138, the PC power management system 130 writes directly to an appropriate I/O port (not shown) and set a bit, resulting in deactivation of a motor (not shown) of the hard disk drive 138. The motor automatically is activated upon a subsequent access of the hard disk drive 138. If the device undergoing a power reduction is the processor 102, the PC power management system 130 writes to the processor clock controller 128 to either slow or halt the processor clock. The reduced-power processor 102 is reactivated by the PC power management system 130 when activity is restored.

The I/O devices 126 include storage devices such as a hard disk drive 138, a diskette drive 140, a keyboard 142, and a display 144. In the illustrative embodiment, the I/O devices 126 in the notebook computer 100 also include a communication interface PCCard 110, such as a local area network (LAN) PCCard 111, a modem PCCard 112, or a combination PCCard.

Figure 2A:
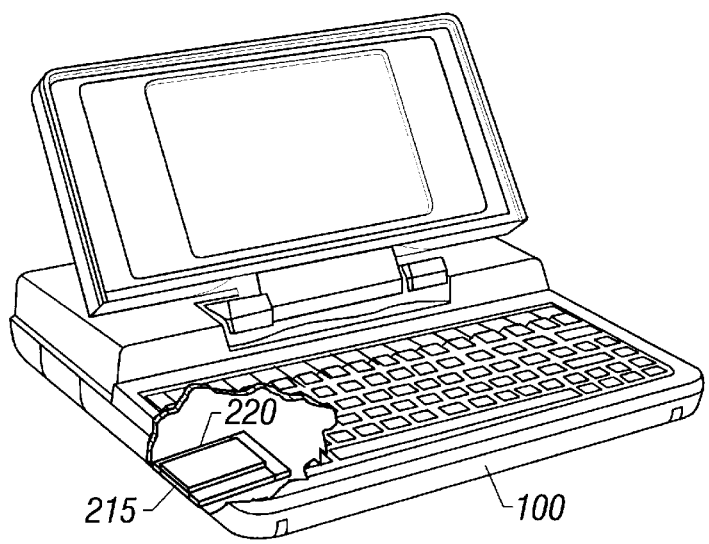
FIGS. 2A and 2B depict, respectively, a pictorial view of a notebook computer and an XJACK connector for connecting an external communication line to the notebook computer.
Figure 2B:
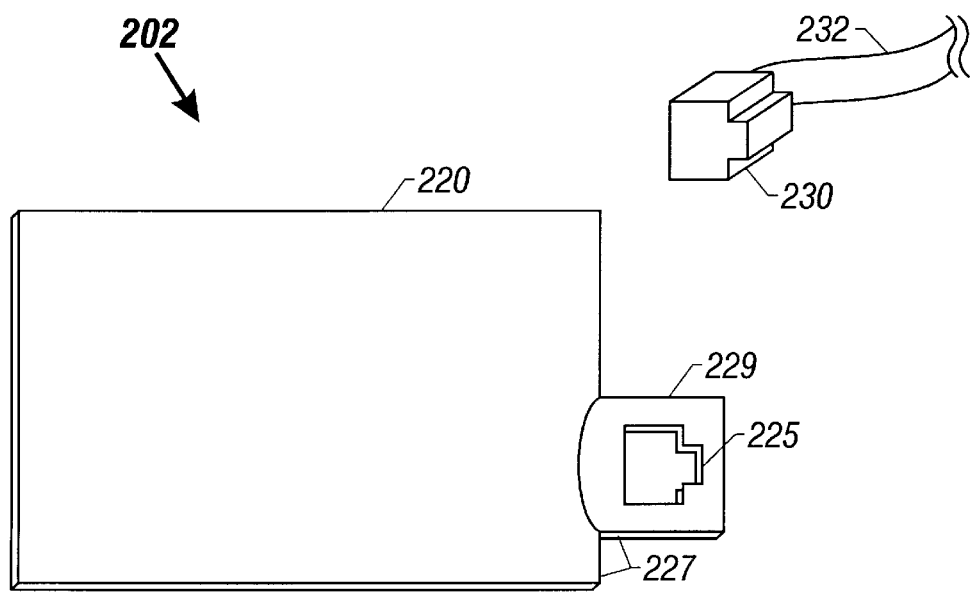

The LAN PCCard 111 is only operational when a connection 114 is made with a LAN communication channel 116. Likewise, the modem PCCard 112 is only operational when a connection 118 is made with a telephone line 120. For example, a connection 114 is illustratively made using an XJACK connector. Referring to FIGS. 2A and 2B, pictorial view of a notebook computer 100 and an XJACK connector 229 is shown. The notebook computer 100 is connected to an external communication channel using a PCCard 220 with an XJACK connector 229. The PCMCIA card 220 is connected to the notebook computer 100 at I/O connectors 215. The XJACK connector 229 is known in the art and includes a PCMCIA card 220 with an RJ-11 telephone socket 225 mounted integrally with the PCMCIA card 220. An RJ-11 telephone plug 230 is inserted into the RJ-11 telephone socket 225 to complete a connection to a telephone line 232.

Referring again to FIG. 1, the LAN PCCard 111 or modem PCCard 112 is typically connected to a communication channel using a special connecting cable, called a dongle (not shown). Removing and reinstalling the communication interface PCCard 110 is generally inconvenient. Therefore, during portable usage, while traveling or working off-site, notebook computer users typically remove the dongle from the communication interface PCCard 110 but leave the communication interface PCCard 110 connected to the notebook computer 100.

In one embodiment, upon disconnection of the dongle from the communication interface PCCard 110, the communication interface PCCard 110 generates a device status change interrupt, notifying the operating system 106 that the communication link is broken. A communication interface PCCard 110 that operates in accordance with the PCMCIA specification can recognize multiple card status changes including battery warnings, insertion of cards, removal or cards, issuing a hardware interrupt request to report incoming faxes, and the like. In the illustrative embodiment, the communication interface PCCard 110 includes a sensor 132 for detecting a connection to the interconnect of the communication interface PCCard 110 such as the XJACK connector. The sensor 132 is connected to a selected contact of the communication interface PCCard 110. A suitable contact for a PCMCIA interface is a CINT# contact (Pin 16) of a 32-bit Cardbus. The CINT# interrupt request signal is enabled by an inserted connector in the RJ-11 telephone socket 225. The pin 134 is implemented to detect the connection or disconnection of an RJ-11 telephone jack or an ethernet LAN connector.

The device status change interrupt invokes the communication device driver 108 operating in conjunction with the operating system 106. The communication device driver 108 queries the communication interface PCCard 110 to verify that the communication link is broken. A communication interface PCCard 110, such as the LAN PCCard 111 or the modem PCCard 112, performs no useful function unless connected to a communication channel. Accordingly, a PC power management system 130, including the communication interface PCCard 110 and the communication device driver 108, detects that a communication connection to the communication interface PCCard 110 is broken, and verifies that the communication link is broken. If the communication link break is verified, the communication device driver 108 terminates the supply of power to the communication interface PCCard 110 and informs the operating system 106 that the communication device is no longer available. Power consumption of the unused device is advantageously avoided using the described technique and battery consumption is reduced, extending the usable lifetime of a charged battery.

Termination of power to the communication interface PCCard 110 also advantageously terminates the generation of thermal heat by the card, reducing the generation of heat within the notebook computer 100. The reduction of thermal heat generation is highly advantageous in present-day portable computers that use higher speed, higher performance processors, and therefore generate greater amounts of thermal heat, while avoiding the use of cooling fans.

The PC power management system 130 completely disconnects power to the communication interface PCCard 110 until a sensor 132 detects that the communication channel is reconnected. The sensor 132 generates an interrupt that is detected by the operating system 106 and activates the communication device driver 108 to restore power to the communication interface PCCard 110.

Power to the communication interface PCCard 110 is automatically disconnected, advantageously reducing power consumption without intervention or request by the user. Because the communication interface PCCard 110 performs no useful function when the communication link is broken, the disconnection event alone is sufficient to properly evoke the termination of power to the card so no action or checking by the user is necessary to efficiently manage power.

Figure 3:
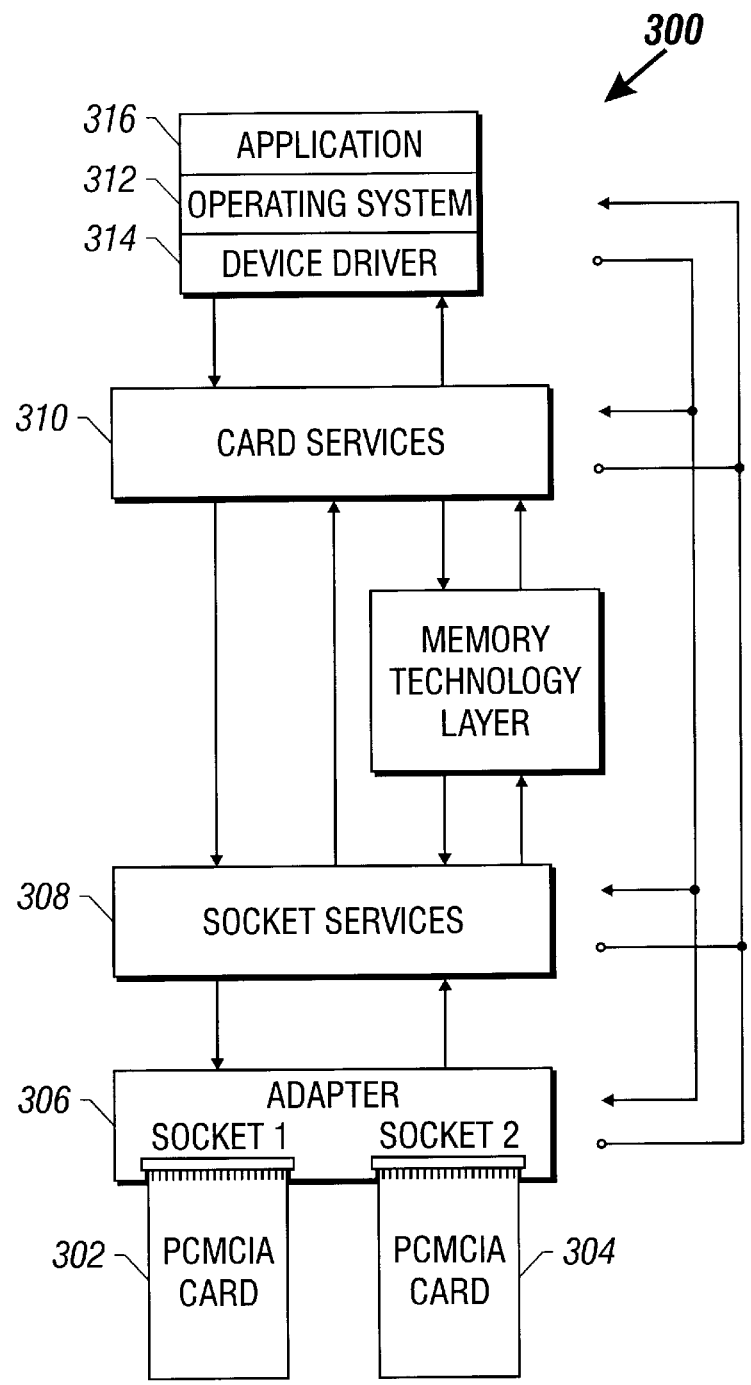
FIG. 3 is a schematic block diagram illustrating software layers of a PCMCIA interface.

Referring to FIG. 3, a schematic block diagram illustrates software layers of a PCMCIA interface 300. A plurality of PCCards 302 and 304 are connected to sockets of a PCMCIA adapter 306. Socket services 308 forms a "lowest level" software interface that is most nearly adjacent to the hardware of the PCMCIA adapter 306. Card services 310 forms a "highest" level software interface that is most nearly adjacent to the software system including an operating system 312, device driver 314, and application software 316. The card services 310 coordinate access to PCCards, sockets, system elements for multiple processes that execute concurrently in a multitasking operating system 312. The card services 310 use the socket services 308 to access a slot of the PCMCIA adapter 306.

Figure 4:
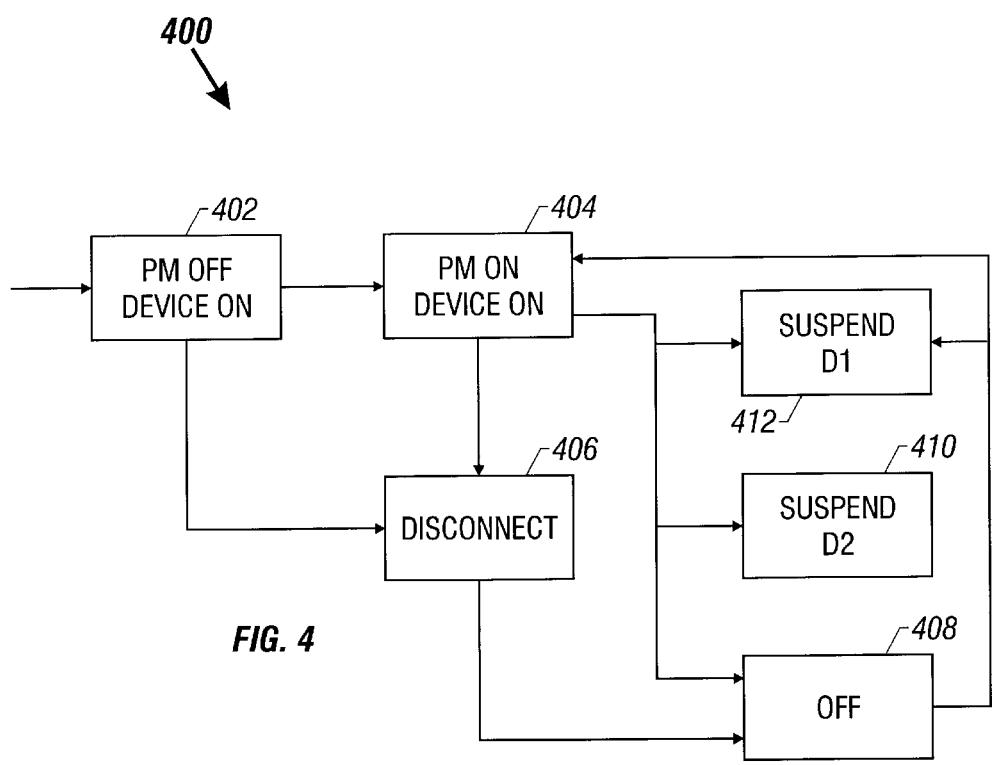
FIG. 4 is a schematic state diagram illustrating an embodiment of a system for managing power applied to a PCCard.

Referring to FIG. 4, a schematic state diagram illustrates an embodiment of a system 400 for managing power applied to a PCCard. The power management system 400 operates in conjunction with a power interface such as the Advanced Configuration and Power Interface (ACPI).

Power states include an activated "ON" state with power management inactive 402, and an activated "ON" state with power management operating 404. A "DISCONNECT" power state 406 is invoked when a communication link to a communication interface PCCard is disconnected when the system 400 is operating either in the activated "ON" state with power management inactive 402 or the "ON" state with power management operating 404.

When the system 400 is functioning in the "ON" state with power management operating 404, a plurality of defined power events invoke the system 400 to change the operating state in a specified manner. A power event is generated by a device in a computer system. Power events are generated by various devices that support a power interface such as ACPI, ranging from processors and controllers to many other devices with a wide range of complexity and sophistication. ACPI power management is supported for PCMCIA cards such as modem cards and LAN cards under various operating systems including Windows 95, Windows NT, OS2, and the like. Defined power events include fixed ACPI events and general-purpose events. Fixed ACPI events include: (1) setting of a carry-bit of a power management timer, (2) actuation of a power button, (3) actuation of a sleep button, (4) a real-time clock (RTC) alarm wakeup, (5) setting of a wake status bit, (6) receipt of a system bus master request, and (7) raising of a global release status. General purpose events include various conditions designated to generate an event signal upon occurrence. General purpose events include wake events, a dispatching event for servicing an ACPI-aware device driver, and a queuing event for determining a control method to queue for execution. ACPI events are typically signaled by a System Control Interrupt (SCI).

The device power states are states of particular devices. Some devices may be in an "OFF" state even when the system as a whole is in a working state. Generic states of a device include an "OFF" state 408, a "D2" device state 410, a "D1" device state 412, and a "FULLY-ON" device state 404.

In the "OFF" state 408, power is fully removed from the device and context is lost when the state is entered so that operating system software reinitializes the device upon power-up.

The "D2" device state 410 is generally expected to save more power and preserves less device context than the "D1" or "FULLY-ON" device states. Buses in the "D2" device state may cause the associated device to lose some context, for example by reducing power on the bus and thereby causing the device to reduce functionality. Specifications of the "D2" device state are defined for a class of devices. Some device classes do not include a "D2" device specification.

The "D1" state 412 generally saves less power and preserves more device context than the "D1" state. Specifications of the "D1" device state are defined for a lass of devices. Some device classes do not include a "D1" device specification.

In the "FULLY-ON" state 404, the device is completely operational, active and responsive. All relevant device context is preserved continuously. The "FULLY-ON" state is assumed to have the highest level of power consumption.

When the system 400 is operating either in the activated "ON" state with power management inactive 402 or the "ON" state with power management operating 404, and the communication link to a communication interface PCCard is disconnected, the system first enters the "DISCONNECT" power state 406 and then passes directly to the "OFF" state 408 in which power to the communication interface PCCard 110 is terminated.

When the communication link to the communication interface PCCard 110 is reconnected, the system 400 typically changes the state of the communications interface device from the "OFF" state 408 to a selected state, generally the "ON" state with power management operating 404. For some communication interface PCCards, the system 400 changes to an intermediate suspended state, such as the "D1" device state 412 from the "OFF" state 408, typically depending on the access time for the card.

The system 400 defines and utilizes a "DISCONNECT" power state 406 to address the problem of powering a communication interface PCCard 110 that is rendered useless by disconnecting the card from a communication link. The new power state is included to advantageously reduce power consumption in portable computers such as notebook computers, automatically and without action by a computer user.

Figure 5:
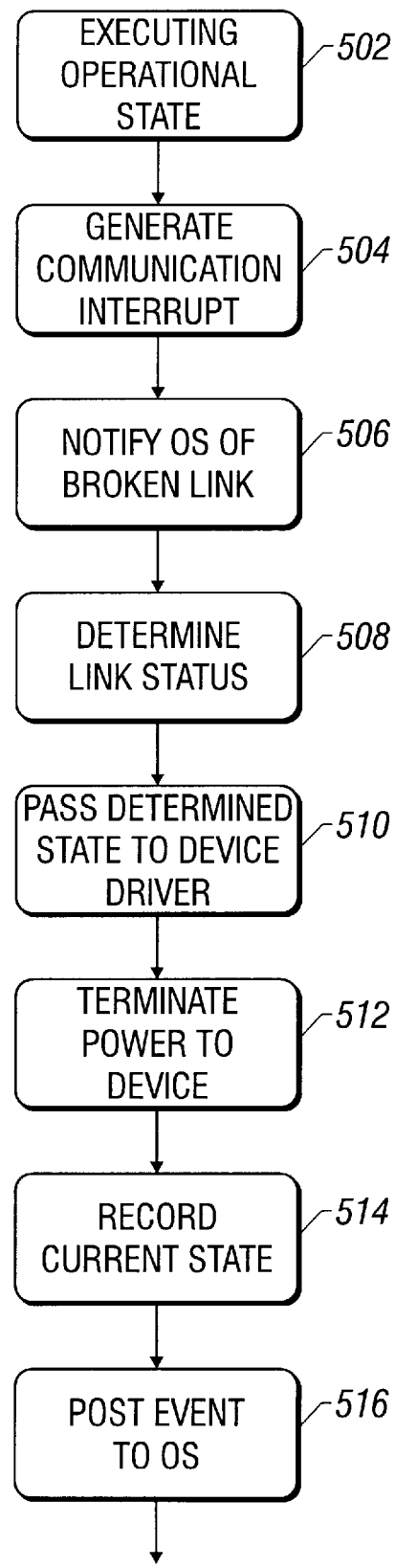
FIG. 5 is a flow chart illustrates operations of a system and operating method for managing power application to individual PCMCIA cards.

Referring to FIG. 5, a flow chart illustrates operations of a system and operating method 500 for managing power application to individual PCCards. In a typical operational state 502 a processor is executing software including applications and operating system routines. In the typical operational state 502, the processor is receptive to an enabled interrupt that generates an interrupt signal when a communication link is broken between a PCCard connected to the processor and an external communication device. In the illustrative embodiment, the wakeup signal is a CINT# wakeup defined according to the PCMCIA specification. The communication interrupt is generated 504 when the communication link is broken, interrupting execution of the processor and notifying the driver of the disconnected communication link in operation 506.

The driver executes a routine that determines the status of the communication link 508 including detection of the power state of the PCCard. The PCCard may be currently operating in a full power state, an "OFF" state, or a suspended state such as the "D1" device state or the "D2" device state. The operation of determining the status of the communication link 508 also determines whether the communication channel was connected to the PCCard prior to the interrupt, whether the PCCard is currently powered, and what type of connection is made by the PCCard, such as a LAN connection, a modem connection, an Integrated Services Digital Network (ISDN) connection or the like. Depending on the status of the communication link, for example, whether the link is powered and the particular PC device that is disconnected, notification of the disconnected state of the communication link is saved by the device driver driving the appropriate PCCard 510. The device driver physically terminates the application of power to the PCCard device 512, shutting off the device. Following termination of power to the PCCard, the PCCard electronics internally records the current state 514 as a state in which power is not physically connected. The device driver then posts an event to the operating system 516 indicating that the power is terminated to the PCCard.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

For example, the illustrative embodiments depict a system that uses PCMCIA cards for interfacing to a communication channel. In other embodiments, other PCCard interfaces may be used as the communication channel interface. Furthermore, the shown embodiments depict modem and LAN PCCards for interfacing to a telephone line and network interface, respectively. In other embodiments, other types of PC interfaces, such as ISDN, ADSL, Cablemodem, cellular interfaces, generic communication devices, and the like are employed for communication.

What is claimed is:

1. A power management method in a computer system having a PCCard, the PCCard having a memory, the PCCard connected to a communication channel, the method comprising:

detecting a disconnection of the communication channel from the PCCard; terminating power supplied to the PCCard in response to the detection of the disconnection of the communication channel; and operating the PCCard in a power management mode responsive to power events; and recording a power state in the PCCard memory in response to the detection of the disconnection of the communication channel; and posting an event to the computer system indicating the power state.

2. A method according to claim 1 wherein:

the power management mode is a mode according to an Advanced Configuration and Power Interface (ACPI) specification.

3. A method according to claim 1 further comprising:

operating the PCCard in a power management mode responsive to power events by actions including: (1) entering a fully-powered state; and (2) entering a suspended state.

4. A method according to claim 3 wherein:

the power management mode is a mode according to an Advanced Configuration and Power Interface (ACPI) specification.

5. A method according to claim 1 wherein:

the PCCard is a Personal Computer Memory Card Industry Association (PCMCIA) card.

6. A method according to claim 1 wherein:

the PCCard is a Local Area Network (LAN) interface card.

7. A method according to claim 1 wherein:

the PCCard is a modulator/demodulator (modem) interface card.

8. A method according to claim 1 wherein:

the PCCard is an Integrated Services Digital Network (ISDN) interface card.

9. A method according to claim 1 wherein:
the PCCard is a generic communication interface card.

10. The power management method of claim 1, wherein the power events include: (1) setting of a carry-bit of a power management timer, (2) actuating of a power button, (3) actuating of a sleep button, (4) setting a real-time clock (RTC) alarm wakeup, (5) setting of a wake status bit, (6) receipt of a system bus master request, and (7) raising of a global release status.

11. A computer program product comprising:
a computer usable medium having computable readable code embodied therein including an executable program code for performing:
  detection of a disconnection of a communication channel from a PCCard, the PCCard having a memory;
  termination of power supplied to the PCCard in response to the detection of the disconnection of the communication channel;
  operation of the PCCard in a power management mode responsive to power events;
  recordation of a power state in the PCCard memory in response to the detection of the disconnection of the communication channel; and
  posting of an event to the computer system indicating the power state.

12. The computer program product of claim 11, wherein power events include: (1) setting of a carry-bit of a power management timer, (2) actuating of a power button, (3) actuating of a sleep button, (4) setting a real-time clock (RTC) alarm wakeup, (5) setting of a wake status bit, (6) receipt of a system bus master request, and (7) raising of a global release status.

13. A computer system comprising:
a processor;
a storage coupled to the processor, the storage including a program storage;
a PCCard detachably connected to the processor, the PCCard including a memory and a communication interface for interfacing to a communication channel; and
a sensor for detecting connection and disconnection of a cable linking the communication interface to the communication channel;
an executable program code stored in the program storage, the executable program code including:
  a routine for detecting a disconnection of the communication channel from the PCCard; and
  a routine for terminating power supplied to the PCCard in response to the detection of the disconnection of the communication channel; and
  a routine for operating the PCCard in a power management mode responsive to power events;
  a routine for recording a power state in the PCCard memory in response to the detection of the disconnection of the communication channel; and
  a routine for posting an event to the computer system indicating the power state.

14. A computer system according to claim 13 wherein the executable program code further includes:
a routine for operating the PCCard in a power management mode responsive to power events by actions including: (1) entering a fully-powered state; and (2) entering a suspended state.

15. A computer system according to claim 14 wherein:
the power management mode is a mode according to the Advanced Configuration and Power Interface (ACPI) specification.

16. A computer system according to claim 13 wherein: the PCCard is a Personal Computer Memory Card Industry Association (PCMCIA) card.

17. A computer system according to claim 13 wherein:
the PCCard is a Local Area Network (LAN) interface card.

18. A computer system according to claim 13 wherein:
the PCCard is a modulator/demodulator (modem) interface card.

19. A computer system according to claim 13 wherein:
the PCCard is an Integrated Services Digital Network (ISDN) interface card.

20. A method according to claim 13 wherein:
the PCCard is a generic communication interface card.

21. The computer system of claim 13, wherein the routine for operating the PCCard in a power management mode detects the power events, the power events including: (1) setting of a carry-bit of a power management timer, (2) actuating of a power button, (3) actuating of a sleep button, (4) setting a real-time clock (RTC) alarm wakeup, (5) setting of a wake status bit, (6) receipt of a system bus master request, and (7) raising of a global release status.

22. A computer program product comprising:
a computer usable medium having computable readable code embodied therein including an executable program code for performing:
  a routine for detecting a disconnection of a communication channel from a PCCard, the PCCard having a memory;
  a routine for terminating power supplied to the PCCard in response to the detection of the disconnection of the communication channel;
  a routine for operating the PCCard in a power management mode responsive to power events;
  a routine for recording a power state in the PCCard memory in response to the detection of the disconnection of the communication channel; and
  a routine for posting an event to the computer system indicating the power state.

23. A PCCard comprising:
a memory;
a communication interface for interfacing to a communication channel;
a sensor for detecting connection and disconnection of a cable linking the communication interface to the communication channel;
a means for operating the PCCard in a power management mode responsive to power events;
a means for recording a power state in the PCCard memory in response to the detection of the disconnection of the communication channel; and
a means for posting an event to the computer system indicating the power state.

24. A PCCard according to claim 23 wherein:
the PCCard is a Personal Computer Memory Card Industry Association (PCMCIA) card.

25. A PCCard according to claim 23 wherein:
the PCCard is a Local Area Network (LAN) interface card.

26. A PCCard according to claim 23 wherein:
the PCCard is a modulator/demodulator (modem) interface card.

27. A PCCard according to claim 23 wherein:
the PCCard is an Integrated Services Digital Network (ISDN) interface card.

28. The PCCard of claim 23 wherein the power events include: (1) setting of a carry-bit of a power management timer, (2) actuating of a power button, (3) actuating of a sleep button, (4) setting a real-time clock (RTC) alarm wakeup, (5) setting of a wake status bit, (6) receipt of a system bus master request, and (7) raising of a global release status.

* * * * *